Patented Apr. 15, 1947

2,419,043

UNITED STATES PATENT OFFICE 2,419,043

COMBUSTIBLE SYNTHETIC RESINS

Thaddeus Urbanski, London, England

No Drawing. Application May 25, 1943, Serial No. 488,456. In Great Britain June 5, 1942

8 Claims. (Cl. 260—67)

This invention relates to a new type of synthetic resin and to a process for the production thereof.

As is well known the properties of ordinary synthetic resins can be varied within very wide limits depending on the extensive range of originating materials used, the conditions of reaction and those of after-treatment of the resin.

It has not hitherto been possible however, to render any of these resins self-combustible or even easily combustible. Resins with such properties would be of great value, for they could then be used as ingredients of high explosives, propellents or pyrotechnic mixtures.

It has now been discovered however, that it is possible to obtain thermoplastic resins having the property of being partially or totally self-combustible, by the polymerisation or condensation of nitro compounds.

In accordance with the present invention, such resins containing nitro groups are produced by the polymerisation or condensation of aliphatic aldehydes and preferably formaldehyde or polymers thereof, with organic nitro-compounds containing primary nitro groups, i. e. —$CH_2.NO_2$.

Examples of the foregoing nitro-compounds are nitroparaffins and preferably mononitroparaffins such as nitromethane, nitroethane, 1-nitropropane and higher homologues.

Further examples are aliphatic aromatic primary nitro-compounds such as phenyl-nitromethane and homologues thereof and also nuclearly nitrated derivatives thereof.

Still further examples of nitro-compounds suitable for the purpose of the invention are nitro-alcohols and especially suitable among these are the nitro-alcohols which can themselves be prepared by condensing nitromethane, nitroethane and homologous primary nitroparaffins with formaldehyde.

All the foregoing nitro-compounds can be used individually or as mixtures.

The condensation reaction may be carried out in an acid, neutral or alkaline medium giving products with different properties depending on the pH employed, the nature of the medium in other respects, the concentration of the reactants and the temperature.

An alkaline medium may be formed from strong or weak alkalies, basic salts or nitrogen bases separately or as mixtures. The action of ammonia amines or other nitrogen bases is especially noteworthy because these substances participate in the condensation reaction and modify some of the physical and chemical properties of the resulting resin.

Inasmuch as in the foregoing cases, the nitrogen bases participate in the formation of the resin molecule the latter assumes a basic character and when the quantity of bases originally present is small, the reactants condense in a neutral or even slightly acid medium, due to the absorption of the base.

The reaction may also be carried out in the presence of ammonium salts and/or salts of other nitrogen bases in an acid medium, an acid reaction being ensured if necessary, by the addition of a relatively small proportion of acid and preferably of an ionisable organic acid. In this case also the nitrogen base radical reacts with the nitro compound and the aldehyde and participates in the formation of the resin molecule.

The medium employed for the reaction may be an aqueous or non-aqueous solvent or mixture of solvents, or the reactants may be emulsified.

The concentrations used may vary within relatively wide limits, whilst the temperatures can vary from room temperature (say 15° C.) to an elevated temperature of the order of 150° C. The consistency of the resulting product ranges from that of a fairly mobile oily resin obtained at lower temperatures and concentrations, to that of a viscous or hard resin obtained by working at higher temperatures and concentrations. The other physical properties of the resins exhibit a similar range of variations.

The following examples illustrate various methods of carrying the invention into practical effect.

EXAMPLE I

*Resin prepared in a neutral medium*

3 mols. of formaldehyde (5–40% solution) are mixed with 1 mol. of ammonia and 1 mol. of 1-nitropropane. The reaction starts spontaneously at room temperature, but the rate of reaction can be increased by heating the mixture to a temperature above 50° C. The mixture is maintained at this relatively elevated temperature for a few hours to complete the reaction. The reaction time may obviously be shortened by keeping the reaction mixture at a still higher temperature.

The ammonia is taken up by the resulting resin and the liquid becomes neutral or even slightly acid in some cases. The resin is separated from the liquor, washed with hot water and dried.

Residual quantities of resin can be obtained from the liquor and wash-water by evaporation, salting-out or extraction with suitable solvents.

EXAMPLE II

*Resin prepared in an alkaline medium*

3 mols. of formaldehyde are mixed with 1½ mols. of ammonia and 1 mol. of 1-nitropropane. A temperature of 50° C. or higher is maintained for a few hours in order to accelerate the reaction which commences at room temperature. The resin is recovered from the reaction mixture as set forth in Example I.

EXAMPLE III

*Resin prepared with removal of some of intermediate products*

3 mols. of formaldehyde (5–40% solution) are mixed with ½–1½ mols. or ammonia and 1 mol. of 1-nitropropane. The reaction starts spontaneously at room temperature and can be carried out at this temperature or at a higher temperature, such as 90–100° C. After a certain time, which depends on the temperature of reaction, e. g. it take 15 min.–1 hour at 90–95°, the reaction is interrupted, the reaction mixture cooled down and the precipitated oil is separated from the liquor by decantation or filtration, which might be preceded by centrifuging. This oil contains some lachrymatory substances and shows a relatively lower chemical stability.

After removing this oil, the liquor is treated in the usual way as described in Example I or II, e. g. the liquor is heated to a temperature of 50° C. or higher. The liquor can also be mixed during this period with additional quantities of ammonia and formaldehyde.

After a few hours of heating the resin formed can be separated from the residual liquor and treated as set forth in Example I. Also, a certain amount of resin can be recovered from the liquor as set forth in Example I.

EXAMPLE IV

*Resin prepared in an alkaline medium*

1 mol. of 1-nitropropane is mixed with ½ mol. of hexamethylene tetramine in aqueous solution and the mixture further treated as set forth in Example I.

EXAMPLE V

*Resin prepared in an acid medium*

3 mols. of formaldehyde (5–40% solution) are mixed with 1–1½ mols. of ammonium acetate, with the addition of a small amount such as .01–.1 mol. of acetic acid. The resulting solution is mixed with 1-nitropropane and heated to 40° C. or over for a few hours in order to accelerate the reaction. The resulting resin is recovered from the reaction mixture as set forth in Example I.

Other ammonium or alkyl- or aryl-ammonium salts of organic acids such as formic, oxalic, tartaric, picric acid and so forth may also be used instead of ammonium acetate, acidification being preferably effected in each case with the free acid corresponding to the ammonium salt used.

EXAMPLE VI

*Resin prepared in an alkaline medium*

1 mol. of 1-nitropropane is mixed with 3 mols. of 5–40% formaldehyde solution and ½ mol. of sodium bicarbonate and the reaction mixed worked up as set forth in Example I.

EXAMPLE VII

*Resin prepared in an alkaline medium in water-xylene emulsion*

1 mol. of 1-nitropropane is dissolved in xylene and mixed with 3 mols. of 5–40% formaldehyde solution and 1 mol. of ammonia. The reaction mixture is maintained in the form of an emulsion by vigorous stirring and is heated to 50° C. or over.

The resulting resin is in solution in the xylene and may be separated from the aqueous liquor and washed with water.

EXAMPLE VIII

*Resin prepared in an alkaline medium in alcohol solution*

1 mol. of 1-nitropropane is mixed with ½ mol. of hexamethylene tetramine and 1 mol. of formaldehyde (in the form of para-formaldehyde) in the presence of ethyl alcohol as solvent and the reaction mixture heated as set forth in the previous examples. The resulting resin is washed with water and dried. Other organic solvents may also be used instead of or in admixture with alcohol.

Examples of the nitro alcohols which may be used instead of nitro hydrocarbons are β-nitro aliphatic alcohols such as β-nitro ethanol, β-nitropropanol and homologous compounds, dimethylol nitroethane, dimethylol nitropropane and homologous compounds and nitro isobutyl glycerol. The method of working with nitro alcohols is similar to that used for nitrohydrocarbons.

EXAMPLE IX 1 mol. of dimethylol nitropropane is mixed with 1 mol. of formaldehyde and 1 mol. of ammonia. The reaction which commences at room temperature is accelerated by heating the reaction mixture and maintaining it at a temperature above 50° C. The resin is separated and treated as set forth in Example I.

EXAMPLE X 1 mol. of dimethylol-nitroethane is mixed with 1 mol. of ammonia and the mixture worked up as set forth in Example I.

EXAMPLE XI 1 mol. of β-nitrobutanol is mixed with 2 mols. of formaldehyde and 1 mol. of ammonia and the mixture worked up as set forth in Example I.

EXAMPLE XII

½ mol. of β-nitrobutanol is mixed with ½ mol. of dimethylol nitropropane, 1 mol. of formaldehyde and 1 mol. of ammonia and the mixture worked up as set forth in Example I.

EXAMPLE XIII 1 mol. of dimethylol nitropropane is mixed with 1 mol. of formaldehyde, 1 mol. of ammonium acetate and from 0.1 to 0.01 mol. of acetic acid and the mixture worked up as set forth in Example I.

EXAMPLE XIV 1 mol. of 1-nitropropane is mixed with 2 mols. of formaldehyde and a small proportion (0.01–0.001 mol.) of calcium hydroxide. The temperature is maintained below 50° C. with the result that dimethylol-nitropropane and a small quantity of monomethylol-nitropropane are formed in solution as the first stage of the reaction.

To this solution of nitro alcohols is added 1 mol. of formaldehyde and 1 mol. of ammonia, the mixture being then further worked up as set forth in Example I to form the resin.

Although as already stated the physical properties of the resins of the present invention vary within wide limits depending on the reaction conditions under which they are prepared, they all possess the property of being partially or totally self-combustible, depending on their oxygen content. Said resins are moreover all soluble in liquid aromatic nitro-compounds such as nitrobenzene, or m- and o-nitrotoluene, molten dinitrobenzene, molten p-nitrotoluene, di- and trinitrotoluene, mono-, di- and trinitro-xylenes, mono-, di- and tri-nitrophenols and so forth. The resins are also soluble in liquid nitric acid esters, such as nitroglycol, nitroglycerine and molten pentaerythritol tetranitrate. The solubility of the resins and the foregoing nitro-compounds and nitric esters is moreover mutual. Some of the foregoing resins also possess the property of being able to gelatinise nitrocellulose.

I claim:

1. The process for the production of combustible, synthetic resins which comprises reacting a nitro-compound of the formula:

$$R.CX_2.NO_2$$

wherein R denotes a radical selected from the group consisting of H—, alkyl and aryl, and X denotes a radical selected from the group consisting of H—, and methylol, with ammonia in amount equal to between 0.5 and 2 moles per mole of the nitro compound and with a quantity of formaldehyde between the limits A and A', where the values of A and A' are based upon the following equations:

$$A=2-Y \text{ and } A'=4-Y$$

where A and A' are the number of moles of formaldehyde reacted per mole of said nitro-compound and Y is the number of alpha methylol groups in said nitro compound, at a temperature between 15° and 150° C. until resinification is complete.

2. The process for the production of combustible, synthetic resins which comprises reacting a nitro-compound of the formula:

$$R.CX_2.NO_2$$

wherein R denotes a radical selected from the group consisting of H—, alkyl and aryl, and X denotes a radical selected from the group consisting of H—, and methylol, with ammonia in amount equal to between 0.5 and 2 moles per mole of the nitrocompound and with a quantity of formaldehyde based upon the equation:

$$F=3-Y$$

where F is the number of moles of formaldehyde reacted per mole of said nitro-compound and Y is the number of alpha methylol groups in said nitro compound, at a temperature between 15° and 150° C. until resinification is complete.

3. The process for the production of combustible, synthetic resins which comprises reacting nitropropane with an equimolecular proportion of ammonia and a trimolecular proportion of formaldehyde at a temperature between 15° and 150° C. until resinification is complete.

4. The process for the production of combustible, synthetic resins which comprises reacting dimethylol nitropropane with an equimolecular proportion of ammonia and an equimolecular proportion of formaldehyde at a temperature between 15° and 150° C. until resinification is complete.

5. The process for the production of combustible, synthetic resins which comprises reacting phenyl-nitropropane with an equimolecular proportion of ammonia and a trimolecular proportion of formaldehyde at a temperature between 15° and 150° C. until resinification is complete.

6. A synthetic, combustible resin produced by the process of claim 1.

7. A synthetic, combustible resin produced by the process of claim 3.

8. A synthetic, combustible resin produced by the process of claim 5.

THADDEUS URBANSKI.

REFERENCES CITED

The following references are of record in the file of this patent:

UNITED STATES PATENTS

| Number | Name | Date |
| --- | --- | --- |
| 2,229,532 | Vanderbilt (1) | Jan. 21, 1941 |
| 2,239,441 | D'Alelio | Apr. 22, 1941 |
| 2,261,788 | Wyler | Nov. 4, 1941 |
| 2,314,308 | Ellis | Mar. 16, 1943 |
| 2,332,482 | Degering | Oct. 19, 1943 |
| 2,355,402 | Sussman | Aug. 8, 1944 |

OTHER REFERENCES

Hess Ind. and Eng. Chem. 28 pp. 339–344 (1936).
Vanderbilt (2) Ind. and Eng. Chem. 32 pp. 34–38 (1940).